(12) United States Patent
Song et al.

(10) Patent No.: US 11,434,133 B2
(45) Date of Patent: Sep. 6, 2022

(54) REFORMING SYSTEM AND REFORMING METHOD USING OFF GAS AS COOLING MEDIUM

(71) Applicants: HYUNDAI MOTOR COMPANY, Seoul (KR); KIA MOTORS CORPORATION, Seoul (KR)

(72) Inventors: Han Eol Song, Seongnam-si (KR); Dong Seok Ko, Yongin-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 322 days.

(21) Appl. No.: 16/904,538

(22) Filed: Jun. 17, 2020

(65) Prior Publication Data
US 2021/0163287 A1    Jun. 3, 2021

(30) Foreign Application Priority Data

Dec. 3, 2019    (KR) .......................... 10-2019-0159337

(51) Int. Cl.
*C01B 3/48*    (2006.01)
*B01J 19/24*    (2006.01)
(Continued)

(52) U.S. Cl.
CPC .............. *C01B 3/48* (2013.01); *B01D 53/047* (2013.01); *B01J 19/0013* (2013.01);
(Continued)

(58) Field of Classification Search
CPC ..... C01B 3/48; C01B 3/56; C01B 2203/0244; C01B 2203/0283; C01B 2203/042; C01B 2203/0811; C01B 2203/0883; C01B 2203/1241; C01B 2203/043; C01B 2203/0827; C01B 2203/1223; C01B 2203/1604; C01B 3/323; C01B 3/32; C01B 3/508; C01B 2203/0205; C01B 2203/04; C01B 2203/047; C01B 2203/0475; C01B 2203/066; C01B 2203/1258;
(Continued)

(56) References Cited

U.S. PATENT DOCUMENTS

2010/0254893 A1*   10/2010   Kim ......................... C01B 3/48
                                                              423/655

FOREIGN PATENT DOCUMENTS

KR            100790850 B1     1/2008

* cited by examiner

*Primary Examiner* — Steven J Bos
*Assistant Examiner* — Syed T Iqbal
(74) *Attorney, Agent, or Firm* — McDonnell Boehnen Hulbert & Berghoff LLP

(57) ABSTRACT

Disclosed is a reforming system using an off gas as a cooling medium, which includes: a compressor configured to compress a feed gas; a cooling system a heat exchanger connected to the compressor and configured to cool the feed gas, the temperature of which has been raised in a compression process, by a cooling medium including cooling water; a reformer configured to generate a synthesis gas including hydrogen by reacting the feed gas, which passed through the heat exchanger, with water; a pressure swing adsorption (PSA) unit configured to separate hydrogen from the synthesis gas generated by the reformer and discharge the off gas; and an off gas line configured to feed the off gas discharged from the PSA unit to the heat exchanger such that the heat exchanger utilizes the off gas as the cooling medium.

14 Claims, 6 Drawing Sheets

(51) Int. Cl.
  *B01J 19/00* (2006.01)
  *B01D 53/047* (2006.01)
  *C01B 3/56* (2006.01)
(52) U.S. Cl.
  CPC ............... *B01J 19/245* (2013.01); *C01B 3/56* (2013.01); *B01D 2256/16* (2013.01); *B01D 2257/502* (2013.01); *B01D 2257/504* (2013.01); *B01J 2208/0053* (2013.01); *B01J 2208/00309* (2013.01); *C01B 2203/0244* (2013.01); *C01B 2203/0283* (2013.01); *C01B 2203/042* (2013.01); *C01B 2203/0811* (2013.01); *C01B 2203/0883* (2013.01); *C01B 2203/1241* (2013.01); *C01P 2006/80* (2013.01)
(58) Field of Classification Search
  CPC ........ C01B 2203/14; C01B 2203/1619; C01B 2203/1623; C01B 3/14; C01B 3/34; C01B 2203/0233; C01B 2203/0425; B01D 53/047; B01D 2256/16; B01D 2257/502; B01D 2257/504; B01J 19/0013; B01J 19/245; B01J 2208/00309; B01J 2208/0053; B01J 8/008; B01J 2208/00106; B01J 2208/00504; B01J 2219/00698; C01P 2006/80; Y02C 20/40
  See application file for complete search history.

REFORMING SYSTEM AND REFORMING METHOD USING OFF GAS AS COOLING MEDIUM

CROSS-REFERENCE TO RELATED APPLICATION

This application claims priority to Korean Patent Application No. 10-2019-0159337, filed on Dec. 3, 2019 in the Korean Intellectual Property Office, the disclosure of which is incorporated herein by reference.

BACKGROUND

1. Field

The present disclosure relates to a reforming system and a reforming method that use an off gas as a cooling medium, and more particularly, to a reforming system and a reforming method for introducing an off gas discharged from a PSA unit into a heat exchanger to use the off gas as a cooling medium, and enhancing the efficiency of a reformer by introducing the off gas into a burner and burning the off gas.

2. Description of the Related Art

When hydrogen is used as a fuel, it does not generate a product that is harmful, except for a nitrogen oxide, to the environment and can be easily stored in various forms such as a high-pressure gas, a liquid gas, and a metal hydride. Thus, the technologies that use hydrogen as an energy source have been developed in various fields. Reforming of vapor is the most commercialized technology as a method for manufacturing hydrogen, and hydrogen is manufactured through the reformer while a natural gas such as town gas is used as a material. The reforming of a natural gas is a technology of converting the natural gas into a hydrogen fuel rapidly and cheaply, and may be a core technology for distributing a fuel cell having high efficiency, small size, light weight, and the stable and prompt starting.

The compressive reforming system compresses a feed gas and supplies the feed gas to the reformer, and the flow rate of the feed gas required by the system is determined according to the load of the process. In order to control the required flow rate, it is designed such that a portion of the feed gas, which has passed through the compressor, circulates and is reintroduced into the compressor. Because the temperature of the feed gas is increased in the compression process, a heat exchanger that cools the feed gas is installed at a rear end of the compressor such that the temperature of the feed gas agrees with the temperature condition of the feed gas introduced into the compressor. The conventional reforming system uses cooling water as the refrigerant for the heat exchanger, and the thermal energy is not utilized and consumed as the cooling water that has exchanged heat with the feed gas, the temperature of which has been increased, is cooled again.

Further, because the methane-vapor reforming reaction is a strong heat absorption reaction, the fuel gas is burned by the burner and the reformer is heated to a temperature of 750 degrees or more to supply heat that is necessary for the reaction. In order to purify hydrogen in the generated gas after the vapor-methane reforming reaction, a hydrogen gas of an ultra-high purity is generated through pressure swing adsorption (PSA). The off gas of the PSA is introduced into the burner and is used in a heating reaction together with the fuel gas. In the case in which the conventional reforming system is used, because the feed gas should be supplied to increase the temperature of the off gas when the off gas is introduced into the burner and is heated, the thermal efficiency of the reforming system deteriorates.

There is a limit to enhancing thermal efficiency in the art, and a reforming system and a reforming method that may utilize the thermal energy consumed in the cooling water has not been suggested.

SUMMARY

The present disclosure has been made in an effort to solve the above-mentioned problems, and provides a reforming system and a reforming method that may increase the temperature of an off gas by using heat wasted in a cooling system by using the off gas as a cooling medium, and utilize the wasted heat discarded through a system that introduces the off gas, the temperature of which has been increased, into the burner.

In accordance with an aspect of the present disclosure, a reforming system using an off gas as a cooling medium may include: a compressor configured to compress a feed gas; a cooling system a heat exchanger connected to the compressor and configured to cool the feed gas, the temperature of which has been raised in a compression process, by a cooling medium including cooling water; a reformer configured to generate a synthesis gas including hydrogen by reacting the feed gas, which passed through the heat exchanger, with water; a pressure swing adsorption (PSA) unit configured to separate hydrogen from the synthesis gas generated by the reformer and discharge the off gas; and an off gas line configured to feed the off gas discharged from the PSA unit to the heat exchanger such that the heat exchanger utilizes the off gas as the cooling medium.

The cooling system may further include: a cooling tower configured to cool the cooling water, which passed through the heat exchanger; a cooling water circulating line connected to a cooling tower and the heat exchanger and through which the cooling water circulates; and a first valve provided on the cooling water circulating line and discharged from the cooling tower to control the flow rate of the cooling water introduced into the heat exchanger.

A temperature sensor configured to measure temperature information of the feed gas may be provided between the heat exchanger and the reformer, and the first valve may feedback the temperature information of the feed gas measured by the temperature sensor to control the flow rate of the cooling water.

The off gas line may include: an off gas introducing line that is a passage, through which the off gas discharged from the PSA unit is introduced into the heat exchanger; and an off gas discharge line that is a passage, through which the off gas, the temperature of which has been raised through heat exchange with the feed gas, is charged; and a second valve configured to control the flow rate of the off gas may be provided in the off gas introducing line.

If the flow rate of the off gas becomes a reference value for a preset rated flow rate for the off gas, the second valve may be opened.

The off gas line may be connected to the heat exchanger in a condition in which the purity of hydrogen produced by the reformer is 99.99% or more.

The reforming system may further include a burner configured to supply heat to the reformer by burning the fuel gas and the off gas discharged from the off gas line, and the reforming system may further include a reactor connected to the reformer and configured to produce hydrogen by reacting CO of the synthesis gas generated by the reformer.

In accordance with an aspect of the present disclosure, a reforming method using the reforming system may include: a first operation mode step of operating the reformer by using the cooling medium of the heat exchanger as the cooling water; a bypass condition detecting step of detecting whether a state condition of the synthesis gas produced by the reformer and the off gas corresponds to a bypass condition; a second operation mode step of burning the off gas discharged from the heat exchanger while using the off gas produced by the reformer as the cooling medium together with the cooling water; a hydrogen purity detecting step of detecting whether the purity of the produced hydrogen is a target purity or more; and a third operation mode step of operating the reforming system while using the off gas as the cooling medium.

In the bypass condition in the bypass condition detecting step, the flow rates of the synthesis gas and the off gas may be 40% or less of the rated flow rate.

In the hydrogen purity detecting step, the detected purity of hydrogen may be 99.99% or more.

The first operation mode step may include: a reformer starting step of starting the reformer; a first valve opening step of opening the first valve provided in the cooling system and configured to control the flow rate of the cooling water; a cooling water system operating step of starting circulation of the cooling water through the heat exchanger; a compressor operating step of starting the compressor; a feed gas introducing step of introducing the feed gas into the compressor; and a burner and reformer operating step of starting the burner and the reformer.

The second operation mode step may include: a PSA unit operating step of starting the PSA unit; a second valve opening step of opening the first valve provided in the off gas line and configured to control the flow rate of the off gas; a first valve temperature control operation starting step of starting a temperature control operation by feeding back temperature information measured by the temperature sensor provided between the heat exchanger and the reformer and configured to measure temperature information of the feed gas such that the first valve provided in the cooling system and configured to control the flow rate of the cooling water maintains a predetermined temperature; and a reformer load control operation step of increasing the flow rate of the off gas of the heat exchanger.

The third operation mode step may include: a reformer load rated operation step of operating the cooling medium of the heat exchanger as the off gas;

and a first valve temperature control operation maintaining step of controlling temperature in preparation for stop of supply of the off gas by the first valve formed in a line, through which the cooling water is introduced into the heat exchanger, and configured to control the flow rate of the cooling water.

According to the reforming system and the reforming method that use an off gas as a cooling medium according to the present disclosure, because the amount of the feed gas consumed by the burner can be reduced as the off gas used as the cooling medium exchanges heat with the feed gas and is introduced into the burner, the economic efficiency of the system can be enhanced.

Further, the overall efficiency of the reforming system can be increased by reducing the amount of the feed gas consumed in the burner.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1:
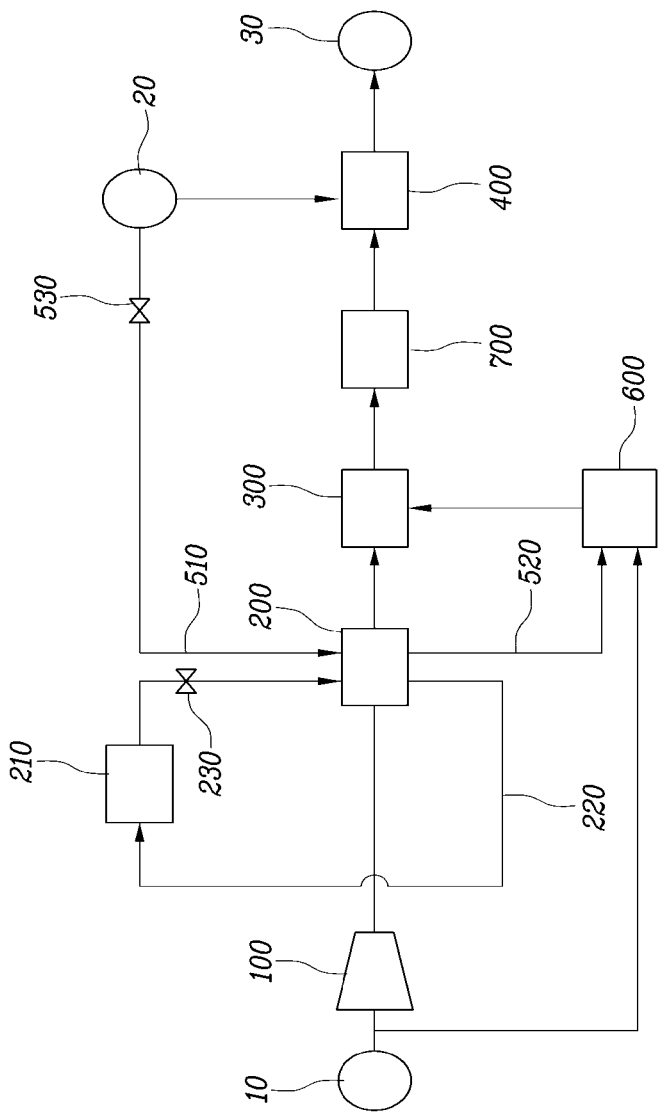
FIG. 1 is a diagram of a reforming system that uses an off gas as a cooling medium according to an embodiment of the present disclosure.

The specific structural and functional descriptions of the embodiments of the present disclosure disclosed in the specification or the application are illustrated for the purpose of describing the embodiments of the present disclosure, and the embodiments of the present disclosure may be carried out in various forms. The present disclosure should not be construed to be limited to the embodiments described in the specification or the application.

The embodiments of the present disclosure may be variously changed and may have various forms. The embodiments illustrated in the drawings and described in the specification according to the concept of the present disclosure are not intended to be limiting, and it should be understood that the present disclosure includes all changes, equivalents, and replacements included in the spirit and technical scope of the present disclosure.

The terms such as first and/or second are used to describe various constituent elements, but the constituent elements are not limited by the terms. A first element may be named a second element and similarly, a second element may be named as a first element while the terms are used only for the purpose of distinguishing one element from the other elements, for example, the terms do not deviate from the scope according to the present disclosure.

When it is mentioned that an element 'is connected to' or 'is electrically connected to' another element, the element may be directly connected to the second element or be directly electrically connected to the second element, or a third element may be present between them. On the other hand, when it is mentioned that an element is "directly connected to" or "directly electrically connected to" another element, it should be understood that a third element is not present between them. It should be construed that other expressions that describe the relationships between elements, such as "between", "directly between", "adjacent to", and "directly adjacent to" may have the same purpose.

Hereinafter, in order to describe the present disclosure in detail, preferred embodiments of the present disclosure will be described with reference to the accompanying drawings. The same reference numerals suggested in the drawings denote the same members.

A reforming system and a reforming method according to the present disclosure can improve the thermal efficiency of a reformer and reduce a feed gas consumed in a burner by using an off gas generated in a process of reforming the feed gas as a cooling medium.

FIG. 1 is a diagram of a reforming system that uses an off gas as a cooling medium according to an embodiment of the present disclosure.

Referring to FIG. 1, a reforming system that uses an off gas as a cooling medium according to an embodiment of the present disclosure may include a compressor 100, a cooling system (which will be described below), a reformer 300, a pressure swing adsorption (PSA) unit 400, and an off gas line 500. The off gas line 500 may include an off gas introducing line 510 and an off gas discharging line 520. Further, the reforming system may additionally include a burner 600 and a reactor 700.

The compressor 100 is a device that compresses the feed gas 10 to a high pressure. The compressor 100 is a device that compresses a natural gas for an operation of a compressive reforming system, and typically compresses the feed gas 10 to about 8 bar to introduce the feed gas 10 into the reforming system. The temperature of the feed gas 10 is increased via a process of compressing the feed gas 10 while the feed gas 10 passes through the compressor 100.

The cooling system is a system that cools the feed gas 10, the temperature of which has been increased in a compression process, and is connected to a rear end of the compressor 100. As a general example, the feed gas 10, the temperature of which has been increased to 170 degrees or more is cooled to 65 degrees. Generally, cooling water is used as the cooling medium of the cooling system.

The reformer 300 is a device that generates hydrogen by reacting vapor and methanol at a high temperature and at a high pressure. The feed gas 10 is converted into a synthesis gas including hydrogen, carbon monoxide, and carbon dioxide by the reformer 300.

The PSA unit 400 separates hydrogen from the synthesis gas generated by the reformer 300 and discharges the remaining off gas 20, from which hydrogen has been removed.

The off gas line 500 feeds the off gas 20 discharged from the PSA unit 400 to the heat exchanger 200 such that the heat exchanger 200 utilizes the off gas 20 as the cooling medium.

The reaction formula of the reforming reaction generated in the reformer 300 is as in reaction formula 1.

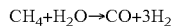  [Reaction formula 1]

The methane-vapor reforming reaction of reaction formula 1 is a strong endothermic reaction, and a forward reaction actively occurs in a high-temperature condition. Accordingly, the reforming system may include a burner 600 that supplies reaction heat to the reformer 300. That is, the burner 600 is operated as a combustion device that delivers thermal energy to the reformer 300.

In a conventional reforming system, the feed gas 10 and the off gas 20 are introduced into the burner 600 and the feed gas 10 and the off gas 20 are burned as fuels in the burner 600 so that reaction heat is supplied to the reformer 300. Because the off gas 20 discharged from the PSA unit 400 is introduced into the burner 600 to be burned in the conventional reforming system, energy for increasing the temperature of the off gas 20 to burn the off gas 20 in the burner 600 is necessary. For example, when the temperature of the off gas 20 discharged from the PSA unit 400 is 40 degrees, the feed gas 10 is used as a fuel to increase the temperature of the off gas 20.

The reactor 700 is a device that produces hydrogen by reacting carbon monoxide in the synthesis gas generated by the reformer 300. Because carbon monoxide is applied to a catalyst used in an electrode of a fuel cell stack as a catalyst poison, a process of removing carbon monoxide may be necessary. Generally, the reaction for removing carbon monoxide uses a shift reaction such as reaction formula 2.

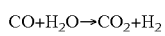  [Reaction formula 2]

In the reforming system that uses the off gas as the cooling medium according to the embodiment of the present disclosure, the off gas 20 discharged from the PSA unit 400 may be introduced into the heat exchanger 200 through the off gas line 500. In an initial operation, cooling water is used as the cooling medium of the heat exchanger 200. If the reforming system is operated and the PSA unit 400 starts to generate the off gas 20, the off gas 20 is introduced into the heat exchanger 200 through the off gas line 500, and the flow rate of the cooling water gradually decreases and the off gas 20 is used as the cooling medium. Thereafter, finally, the cooling medium of the heat exchanger 200 may be replaced by the off gas 20.

The off gas 20 exchanges heat with the feed gas 10 in the heat exchanger 200, and the feed gas 10, the temperature of which has been increased while the feed gas 10 passed through the compressor 100, may provide thermal energy to the off gas 10 to be cooled, and the off gas 20 may receive thermal energy from the feed gas 10 such that the temperature of the off gas 20 is increased. The off gas 20, the temperature of which has been increased, is introduced into the burner 600 and is used as fuel to be burned. Then, because the amount of the supplied feed gas 10, which is necessary for the burner 600, is decreased as the temperature of the off gas 20 has been increased while the off gas 20 passes through the heat exchanger 200, the thermal efficiency of the reforming system can be improved.

For example, when the temperature of the off gas 20, which has passed through the heat exchanger 200, is 90.79 degrees, the temperature of the off gas 20 is increased by 50.79 degrees as compared with the conventional 40 degrees. Accordingly, the amount of the supplied feed gas 10 that is necessary for increasing the temperature of the off gas 20 is decreased in correspondence to the increased amount. As a result, because the system of the present disclosure increases the amount of produced hydrogen when the same amount of the feed gas 10 is consumed, the overall efficiency of the system is increased.

Figure 2:
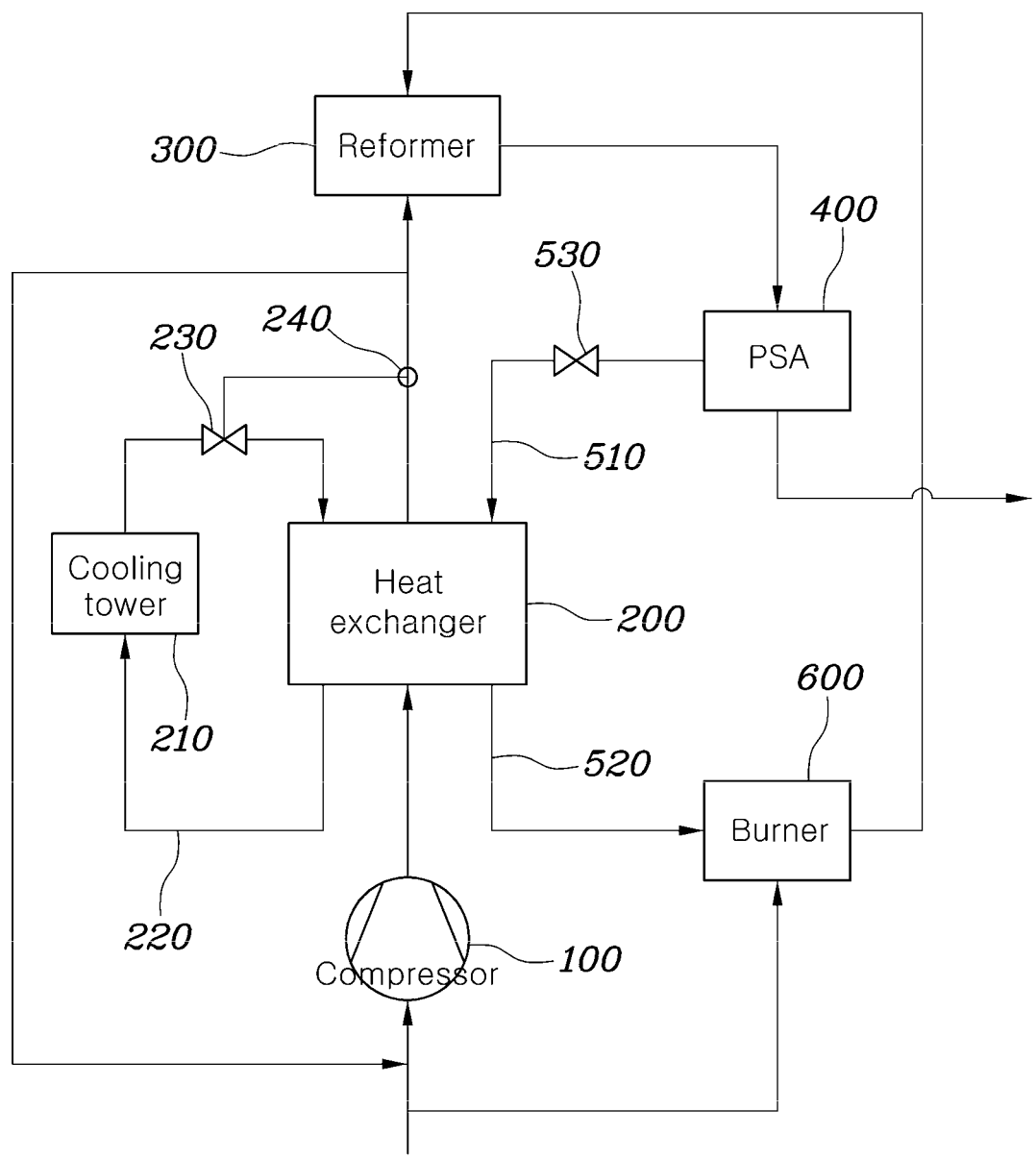
FIG. 2 is a view illustrating a cooling system of the reforming system that uses an off gas as a cooling medium according to the embodiment of the present disclosure.

FIG. 2 is a view illustrating a cooling system of the reforming system that uses an off gas as a cooling medium according to the embodiment of the present disclosure.

Referring to FIG. 2, a cooling system of the reforming system that uses an off gas as a cooling medium according to the embodiment of the present disclosure will be described in detail as follows.

The cooling system of the reforming system that uses an off gas as a cooling medium according to the embodiment of the present disclosure may include a heat exchanger 200, a cooling tower 210, and a first valve 230.

As described above, if the synthesis 10 is introduced into the compressor 100 and is compressed to a high pressure, the temperature of the feed gas 10 is increased. The flow rate of the feed gas 10 that is required by the system may change according to the load of the reforming system. In order to maintain the flow rate required by the reforming system, a portion of the feed gas 10, which has passed through the compressor 10, may circulate and be reintroduced into the compressor 100. Accordingly, the feed gas 10, the temperature of which has been increased in the compression process, may be reintroduced into the compressor 100, and a cooling system may be necessary at a rear end of the compressor 100 to maintain the temperature of the feed gas 10 constant such that the temperature of the feed gas 10 agrees with the temperature condition for the inlet of the compressor 100.

In order to maintain the temperature of the feed gas 10 reintroduced into the compressor 100 constant, the cooling system may include a heat exchanger 200 that cools the feed gas 10. The heat exchanger 200 may decrease the temperature of the feed gas 10 as the cooling medium is introduced into the heat exchanger 200 and receives the thermal energy of the feed gas 10.

At the initial state of the operation of the reforming system, cooling water is used as the cooling medium of the cooling system. The cooling tower 210 is a device that cools the cooling water, the temperature of which has been increased. Because the temperature of the cooling water is increased while passing through the heat exchanger 200, it may be cooled in the cooling tower 210 and may return to the heat exchanger 200 again. To achieve this, a cooling water circulating line 220 connected to the cooling tower 210 and the heat exchanger 200 may be provided. The cooling water decreases the temperature of the feed gas 10 in the heat exchanger 200 through the cooling water circulating line 220, and may be introduced into the cooling tower 210 and be introduced into the heat exchanger 200 again after being cooled again.

A first valve 230 may be provided on the cooling water circulating line 220. The first valve 230 may control the flow rate of the cooling water that flows through the cooling water circulating line 220. The flow rate of the cooling water discharged from the cooling tower 210 and introduced into the heat exchanger 200 may be controlled by the first valve 230.

The first valve 230 may control the flow rate of the cooling water by feeding back the temperature information of the feed gas 10. The temperature of the feed gas 10 that has passed through the compressor 100 is increased to 170 degrees or more and the feed gas 10 is cooled to 65 degrees while passing through the heat exchanger 200, and the first valve 230 controls the flow rate of the cooling water by feeding back the temperature information of the feed gas 10 introduced into the reformer 300. To achieve this, a temperature sensor 240 that may sense temperature information of the feed gas 10 may be provided between the heat exchanger 200 and the reformer 300. Further, a controller that controls the flow rate of the first valve 230 may be further provided.

In the reforming system that uses the off gas as the cooling medium according to the embodiment of the present disclosure, a reforming reaction occurs in the reformer 300 as the reforming system is operated and a synthesis gas starts to be generated by the reformer 300. All the synthesis gas generated by the reformer 300 is bypassed before an appropriate condition for flow rate, temperature, and pressure is reached. If an appropriate state condition is reached, the synthesis gas is introduced into the PSA unit 400, and the PSA unit 400 is operated and the off gas 20 starts to be generated. The condition for introduction of the synthesis gas into the PSA unit 400 may be selectively set, and as one example, the load of the system is 40% and the flow rate of the off gas 20 generated may be 40% of the rated flow rate.

Referring to FIG. 2, the off gas line 500 may include an off gas introducing line 510 that is a passage, through which the off gas 20 discharged from the PSA unit 400 is introduced into the heat exchanger 200, and an off gas discharging line 520 that is a passage, through which the off gas 20, the temperature of which has been increased while the off gas 20 exchanges heat with the feed gas, is discharged. Further, a second valve 530 that controls the flow rate of the off gas 20 may be provided the off gas introducing line 510. The off gas discharging line 520 may be connected to the burner 600 and the off gas 20, the temperature of which has been increased, may be introduced into the burner 600.

If the flow rate of the off gas 20 starts to be generated and becomes a specific flow rate, the second valve 530 is opened. If the second valve 530 is opened, the off gas 20 may be introduced from the PSA unit 400 into the heat exchanger 200 through the off gas introducing line 510. For example, the temperature of the discharged off gas 20 is 40□, and the off gas 20 exchanges heat with the feed gas 10 in the heat exchanger 200 whereby the temperature of the off gas 20 may be increased to 90.79 degrees.

The second valve 530 may be controlled to be opened if the flow rate of the off gas 20 becomes a reference value for the preset rated flow rate for the off gas 20. For example, the reference valve may be 40% of the rated flow rate of the off gas 20.

The off gas 20, the temperature of which has been increased, may be discharged to the off gas discharging line 520 and may be introduced into the burner 600. Accordingly, because the off gas 20 introduced into the burner 600 is introduced after the temperature of the off gas 20 is increased by the off gas line 500, an off gas 20 of a high temperature may be introduced into the burner 600 as compared with a conventional reforming system. Accordingly, the necessary amount of the feed gas 10 may be decreased when the burner 600 burns the off gas 20 and the feed gas 10.

If the off gas 20 is introduced into the heat exchanger 200 and is used as the cooling medium, the amount of the cooling water that circulates in the heat exchanger 200 may be decreased. The amount of the cooling water gradually decreases and finally the cooling medium may be replaced by the off gas 20. When the off gas 20 is used as the cooling medium, the temperature of the feed gas 10 discharged from the cooling system is 65 degrees, and it is the same value when the cooling water is used as the cooling medium. However, in this case, the temperature of the feed gas 10 introduced into the reformer 300 also is controlled such that the cooling water may circulate if it is detected that the feed gas 10 of a predetermined temperature or higher is introduced by continuously feeding back the temperature measured by the temperature sensor 240.

Meanwhile, the purity of the produced hydrogen is an important parameter for determining whether the reforming system is normally operated, and when the purity of hydrogen is not appropriate, the load of the reforming system cannot be increased and is maintained at 40% or less. If the purity of hydrogen becomes 99.99% or more, the load of the reformer 300 is increased to 40% or more and the reformer 300 may be operated at the load of 100%, and when the second valve 530 may be controlled to be opened even when the purity of hydrogen becomes 99.99%.

Figure 3:
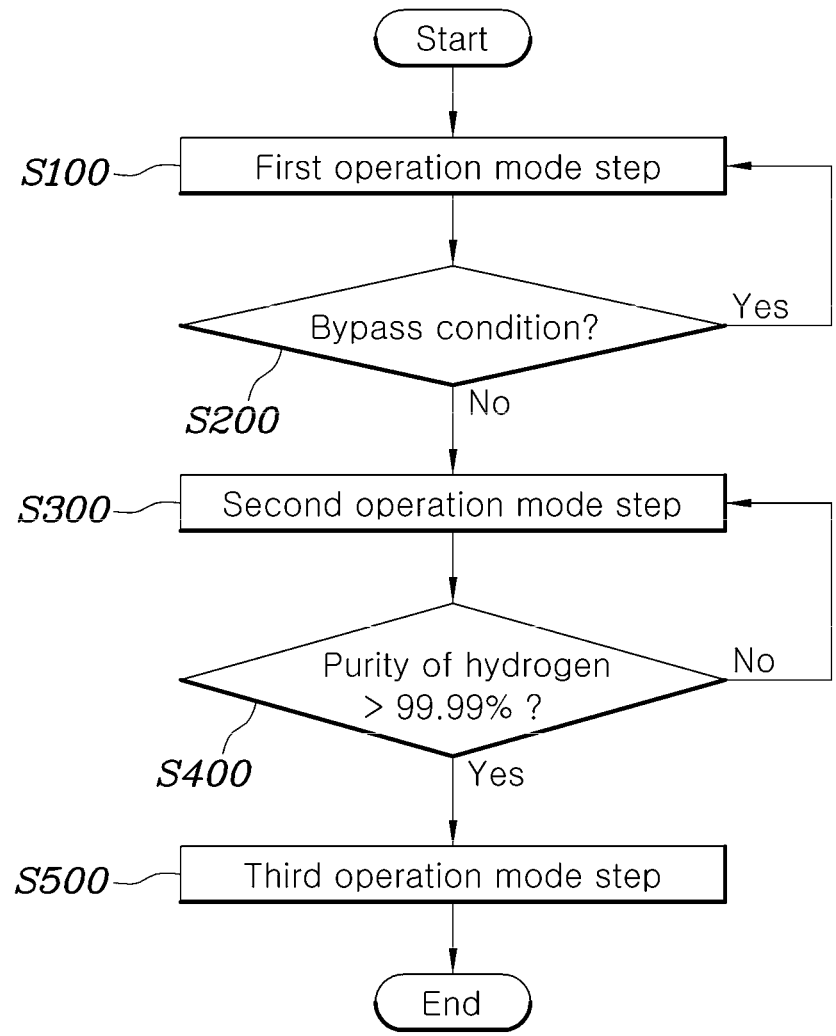
FIG. 3 is a flowchart of a reforming method in which an off gas is used as a cooling medium according to an embodiment of the present disclosure.

FIG. 3 is a flowchart of a reforming method in which an off gas 20 is used as a cooling medium according to an embodiment of the present disclosure.

Figure 4:
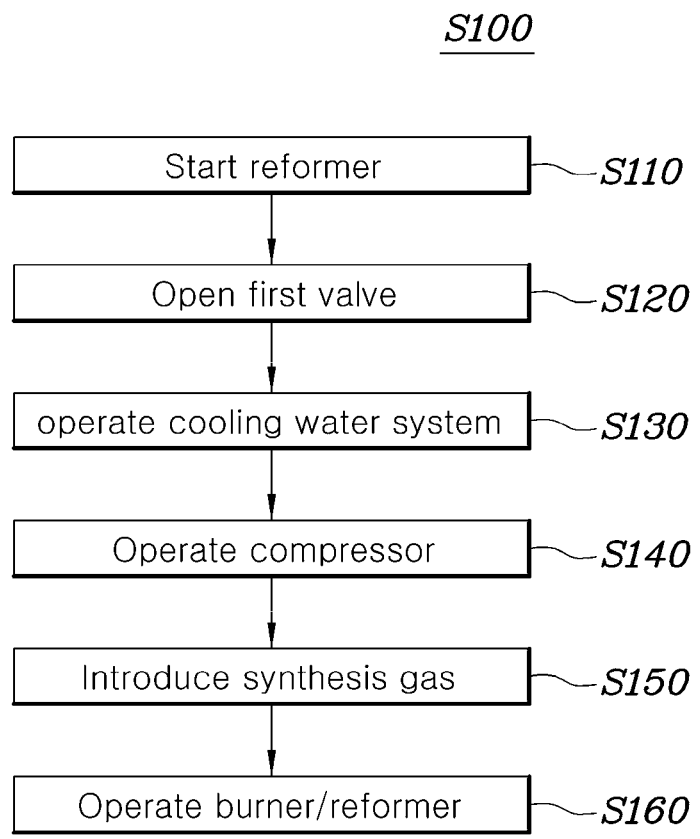
FIG. 4 is a flowchart of a first operation mode step of the reforming method in which an off gas is used as a cooling medium according to the embodiment of the present disclosure.
Figure 5:
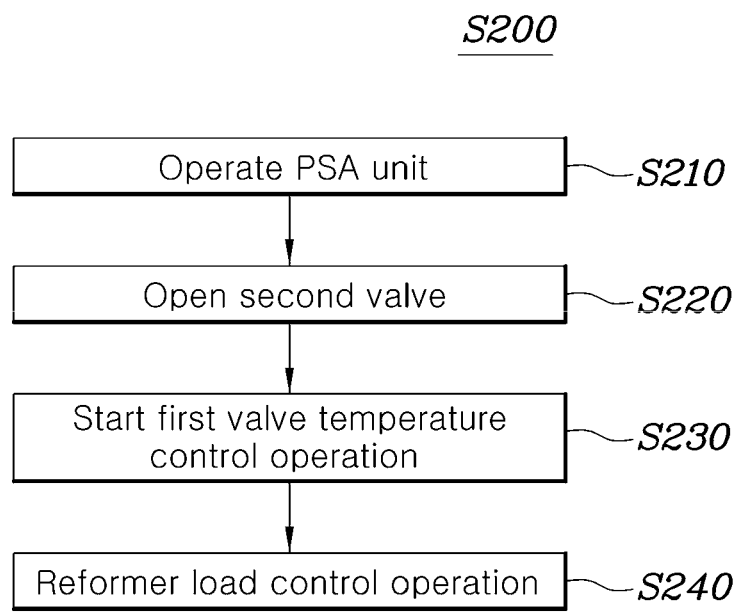
FIG. 5 is a flowchart of a second operation mode step of the reforming method in which an off gas is used as a cooling medium according to the embodiment of the present disclosure.
Figure 6:
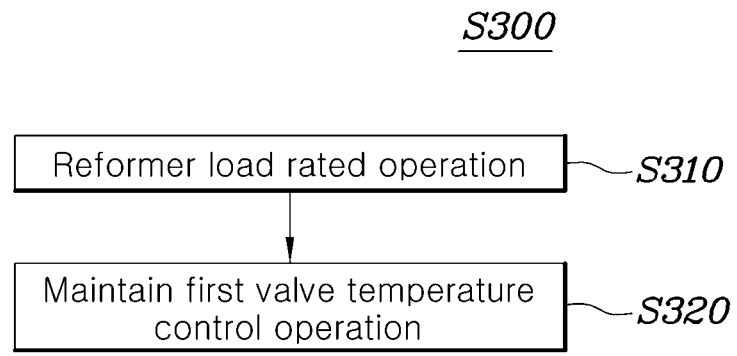
FIG. 6 is a flowchart of a third operation mode step of the reforming method in which an off gas is used as a cooling medium according to the embodiment of the present disclosure.

FIG. 4 is a flowchart of a first operation mode step of the reforming method in which an off gas 20 is used as a cooling medium according to the embodiment of the present disclosure. FIG. 5 is a flowchart of a second operation mode step of the reforming method in which an off gas 20 is used as a cooling medium according to the embodiment of the present disclosure. FIG. 6 is a flowchart of a third operation mode step of the reforming method in which an off gas 20 is used as a cooling medium according to the embodiment of the present disclosure.

Referring to FIGS. 3 to 6, the reforming method in which the off gas 20 is used as the cooling medium according to the embodiment of the present disclosure will be described below in detail.

Referring to FIG. 3, the reforming method in which the off gas 20 is used as the cooling medium according to the embodiment of the present disclosure may include a first operation mode step, a bypass condition detecting step, a second operation mode step, a hydrogen purity detecting step, and a third operation mode step.

The first operation mode step is a step of operating the reformer 300 by using the cooling water as the cooling medium of the heat exchanger 200. That is, the first operation mode step is an initial step of the reforming method in which the off gas 20 is used as the cooling medium according to the embodiment of the present disclosure, and is a step of operating the system with cooling water before the state condition for the synthesis gas and the off gas 20 satisfies a specific condition.

Referring to FIG. 4, the first operation mode step S100 may include a reformer 300 starting step S110 of starting the reformer 300, a first valve 230 opening step S120 opening the first valve 230 provided in the cooling system and configured to control the flow rate of the cooling water, a cooling water system operating step S130 of starting circulation of the cooling water through the heat exchanger 200, a compressor 100 operating step S140 of starting the compressor 100, a feed gas 10 introducing step S150 of introducing the feed gas 10 into the compressor 100, and a burner 600 and reformer 300 operating step S160 of starting the burner 600 and the reformer 300.

After the reformer 300 is operated in the first operation mode step, in the bypass condition detecting step it is detected whether the condition for the flow rates, the temperatures, the pressures of the synthesis gas and the off gas 20 correspond to the bypass condition. For example, in the bypass condition, the flow rates of the synthesis gas and the off gas 20 may be 40% or less of the rated flow rate. That is, when the reformer 300 is operated and the synthesis gas and the off gas 20 are generated, they are bypassed in a condition in which the flow rates of the synthesis gas and the off gas 20 are 40% or less of the rated flow rate, and the system proceeds to the second operation mode step if the flow rates of the synthesis gas and the off gas 20 are 40% or more of the rated flow rate.

The second operation mode step is a step of burning the off gas 20 discharged from the heat exchanger 200 in the burner 600 while the off gas 20 produced by the reformer 300 together with the cooling water of the heat exchanger 200 is used as the cooling medium. That is, the second operation mode step is a step of replacing the cooling water used as the cooling medium of the heat exchanger 200 by the off gas 20.

Referring to FIG. 5, the second operation mode step S200 may include a PSA unit 400 operating step S210 of starting the PSA unit 400, a second valve 530 opening step S220 of opening the first valve provided in the off gas line 500 and configured to control the flow rate of the off gas 20, a first valve 230 temperature control operation starting step S230 of starting a temperature control operation the temperature of the first valve 230 that is provided in the cooling system and controls the flow rate of the cooling water is maintained, and a reformer 300 load control operation step S240 of increasing the flow rate of the off gas 20 of the heat exchanger 200.

In the second operation mode step, the off gas 20 may be introduced into the heat exchanger 200 by opening the second valve 530. Then, the first valve 230 controls the flow rate of the cooling water, and the amount of the cooling water decreases by the ratio of the off gas 20 used as the cooling medium. In the second operation mode step, the amount of the off gas 20 is increased from 40% to 100%, and the ratio of the cooling water decrease according to the ratio. For example, when the amount of the off gas 20 in the cooling medium of the heat exchanger 200 becomes 60%, the amount of the cooling water may be controlled to 40%. However, the amount of the cooling water may be controlled such that the first valve 230 maintains the temperature of the feed gas 10 introduced into the reformer 300 by continuously feeding back the temperature information measured by the temperature sensor 240.

After the second operation mode step, in the hydrogen purity detecting step, it is detected whether the purity of hydrogen is 99.99% or more. If the purity of hydrogen is 99.99% or more, the third operation mode step is started.

Referring to FIG. 6, the third operation mode step S300 may include a reformer 300 load rated operation step S310 of operating the cooling medium of the heat exchanger 200 as the off gas 20, and a first valve 230 temperature control operation maintaining step S320 of controlling temperature in preparation for stop of supply of the off gas 20 by the first valve 230 formed in a line, through which the cooling water is introduced into the heat exchanger 200, and configured to control the flow rate of the cooling water.

In the reformer 300 load rated operation step, the second valve 530 is fully opened such that the off gas 20 is used as the cooling medium, and the flow rate of the off gas 20 reaches 100%. However, even in this case, the first valve 230 is not closed but when the supply of the off gas 20 is stopped while the temperature information of the feed gas 10 measured by the temperature sensor 240, the temperature control operation is maintained such that the off gas flows through the heat exchanger 200.

As described above, according to the reforming system and the reforming method, in which the off gas 20 is used as the cooling medium, according to the present disclosure, the off gas 20 generated by the PSA unit 400 is used as the cooling medium, the efficiency of the reformer 300 can be improved by using the waste heat generated by the heat exchanger 200 for increasing the temperature of the off gas 20 and the amount of the feed gas 10 burned by the burner 600 can be decreased.

As an example, in a description of the effects of the present disclosure, the temperature of the off gas 20 becomes 90.79 degrees that is a temperature after the off gas 20 passes through the heat exchanger 200 at 40 degrees that is a temperature when the off gas 20 is discharged from the PSA unit 400 and the enthalpy increases. Because the temperature of an exit gas discharged from an exit of the burner 600 should be maintained constant when the off gas 20, the temperature of which has been increased, is introduced into the burner 600 and is burned, the amount of the supplied feed gas 10 decreases. The decrease rate of the feed gas 10 may be calculated as follows.

$$1 - \left(\frac{C_{p,OG}}{HHV_{OG}}\right)(T_{OG,2} - T_{OG,1})$$

Cp,OG (specific heat of off gas): 34.52 kJ/kgmole-° C.
HHVOG (emitted heat of off gas): 192,000 kJ/kgmole
TOG,2 (changed temperature of off gas): 90.79° C.
TOG,1 (existing temperature of off gas): 40° C.

According to the equation, the decrease rate of the feed gas 10 becomes 0.91%. The number is an example, and may be changed according to various operations of the reforming system.

Further, because the amount of hydrogen that may be generated with the same amount of the feed gas 10 is increased as the feed gas 10 is decreased, the thermal efficiency of the reforming system can be improved.

Therefore, the disclosed embodiments of the present disclosure do not limit the technical spirit of the present disclosure but are illustrative, and the scope of the technical spirit of the present disclosure is not limited by the embodiments of the present disclosure. The scope of the present disclosure should be construed by the claims, and it will be understood that all the technical spirits within the equivalent range fall within the scope of the present disclosure.

What is claimed is:

1. A reforming system using an off gas as a cooling medium, the reforming system comprising:
   a compressor configured to compress a feed gas;
   a cooling system comprising a heat exchanger connected to the compressor and configured to cool the feed gas, the temperature of which has been raised in a compression process by a cooling medium comprising cooling water;
   a reformer configured to generate a synthesis gas comprising hydrogen by reacting the feed gas, which passed through the heat exchanger, with water;
   a pressure swing adsorption (PSA) unit configured to separate hydrogen from the synthesis gas generated by the reformer and discharge the off gas; and
   an off gas line configured to feed the off gas discharged from the pressure swing adsorption (PSA) unit to the heat exchanger such that the heat exchanger utilizes the off gas as the cooling medium.

2. The reforming system of claim 1, wherein the cooling system further comprises:
   a cooling tower configured to cool the cooling water, which passed through the heat exchanger;
   a cooling water circulating line connected to a cooling tower and the heat exchanger and through which the cooling water circulates; and
   a first valve provided on the cooling water circulating line and discharged from the cooling tower to control the flow rate of the cooling water introduced into the heat exchanger.

3. The reforming system of claim 2, wherein a temperature sensor configured to measure temperature information of the feed gas is provided between the heat exchanger and the reformer, and the first valve feeds back the temperature information of the feed gas measured by the temperature sensor to control the flow rate of the cooling water.

4. The reforming system of claim 1, wherein the off gas line comprises:
   an off gas introducing line that is a passage, through which the off gas discharged from the PSA unit is introduced into the heat exchanger; and
   an off gas discharge line that is a passage, through which the off gas, the temperature of which has been raised through heat exchange with the feed gas, is charged, and
   wherein a second valve configured to control the flow rate of the off gas is provided in the off gas introducing line.

5. The reforming system of claim 4, wherein if the flow rate of the off gas becomes a reference value for a preset rated flow rate for the off gas, the second valve is opened such that, after the heat exchanger uses the cooling water as the cooling medium at an initial stage of the reforming system, the flow rate of the cooling water gradually decreases and the flow rate of the off gas gradually increases and the cooling medium is finally replaced by the off gas.

6. The reforming system of claim 1, wherein the off gas line is connected to the heat exchanger in a condition in which the purity of hydrogen produced by the reformer is 99.99% or more.

7. The reforming system of claim 1, further comprising:
   a burner configured to supply heat to the reformer by burning the fuel gas and the off gas discharged from the off gas line.

8. The reforming system of claim 1, further comprising:
   a reactor connected to the reformer and configured to produce hydrogen by reacting CO of the synthesis gas generated by the reformer.

9. A reforming method using the reforming system of claim 1, the reforming method comprising:
   a first operation mode step of operating the reformer by using the cooling medium of the heat exchanger as the cooling water;
   a bypass condition detecting step of detecting whether a condition for the flow rates, the temperatures, and the pressures of the synthesis gas produced by the reformer and the off gas corresponds to a bypass condition;
   a second operation mode step of burning the off gas discharged from the heat exchanger while using the off gas produced by the reformer as the cooling medium together with the cooling water;
   a hydrogen purity detecting step of detecting whether the purity of the produced hydrogen is a target purity or more; and
   a third operation mode step of operating the reforming system while using the off gas as the cooling medium.

10. The reforming method of claim 9, wherein in the bypass condition in the bypass condition detecting step, the flow rates of the synthesis gas and the off gas are 40% or less of the rated flow rate.

11. The reforming method of claim 9, wherein in the hydrogen purity detecting step, the detected purity of hydrogen is 99.99% or more.

12. The reforming method of claim 9, wherein the first operation mode step comprises:
   a reformer starting step of starting the reformer;
   a first valve opening step of opening the first valve provided in the cooling system and configured to control the flow rate of the cooling water;
   a cooling water system operating step of starting circulation of the cooling water through the heat exchanger;
   a compressor operating step of starting the compressor;
   a feed gas introducing step of introducing the feed gas into the compressor; and a burner and reformer operating step of starting the burner and the reformer.

13. The reforming method of claim 9, wherein the second operation mode step comprises:
   a PSA unit operating step of starting the PSA unit;
   a second valve opening step of opening the first valve provided in the off gas line and configured to control the flow rate of the off gas;
   a first valve temperature control operation starting step of starting a temperature control operation by feeding back temperature information measured by the temperature sensor provided between the heat exchanger and the reformer and configured to measure temperature information of the feed gas such that the first valve provided in the cooling system and configured to control the flow rate of the cooling water maintains a predetermined temperature; and
   a reformer load control operation step of increasing the flow rate of the off gas of the heat exchanger.

14. The reforming method of claim 9, wherein the third operation mode step comprises:
   a reformer load rated operation step of operating the cooling medium of the heat exchanger as the off gas; and
   a first valve temperature control operation maintaining step of controlling temperature in preparation for stop of supply of the off gas by the first valve formed in a line, through which the cooling water is introduced into the heat exchanger, and configured to control the flow rate of the cooling water.

* * * * *